United States Patent
Golan et al.

(10) Patent No.: US 10,558,853 B2
(45) Date of Patent: Feb. 11, 2020

(54) METHODS AND APPARATUS FOR SHARING OF MUSIC OR OTHER INFORMATION

(71) Applicants: Massachusetts Institute of Technology, Cambridge, MA (US); Tal Achituv, Needham, MA (US)

(72) Inventors: Amos Golan, Boston, MA (US); Tal Achituv, Needham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 128 days.

(21) Appl. No.: 15/972,228

(22) Filed: May 7, 2018

(65) Prior Publication Data

US 2018/0322335 A1    Nov. 8, 2018

Related U.S. Application Data

(60) Provisional application No. 62/502,715, filed on May 7, 2017.

(51) Int. Cl.
| | |
|---|---|
| A61B 5/00 | (2006.01) |
| G06K 9/00 | (2006.01) |
| G06F 3/01 | (2006.01) |
| G06Q 50/00 | (2012.01) |
| G06T 7/70 | (2017.01) |
| G06T 7/73 | (2017.01) |
| G06F 3/16 | (2006.01) |
| G06F 3/00 | (2006.01) |

(52) U.S. Cl.
CPC .......... *G06K 9/00335* (2013.01); *G06F 3/011* (2013.01); *G06F 3/012* (2013.01); *G06F 3/017* (2013.01); *G06F 3/165* (2013.01); *G06Q 50/01* (2013.01); *G06T 7/70* (2017.01); *G06T 7/73* (2017.01); *G06T 2207/10048* (2013.01); *G06T 2207/30204* (2013.01)

(58) Field of Classification Search
CPC ................ G06K 9/00; G06T 7/00; G06F 3/00
USPC .......................................................... 382/103
See application file for complete search history.

(56) References Cited

U.S. PATENT DOCUMENTS

| | | | |
|---|---|---|---|
| 7,236,739 B2 * | 6/2007 | Chang ..................... | H04W 4/08 455/186.1 |
| 8,433,759 B2 * | 4/2013 | Styles ..................... | G06F 3/017 455/456.3 |
| 9,412,021 B2 | 8/2016 | Biswas et al. | |

(Continued)

OTHER PUBLICATIONS

Bassoli, A., et al., tunA: Local Music Sharing with Handheld Wi-Fi Devices; published in Proceedings of 5th Wireless World Conference 2004.

(Continued)

*Primary Examiner* — Abolfazl Tabatabai
(74) *Attorney, Agent, or Firm* — Stephen R. Otis

(57) ABSTRACT

One or more sensors may detect a gesture or gestures by one or more human users. The detected gesture or gestures may trigger sharing of music or other information. For instance, a first user may be listening to music on headphones. A second user may turn her head, so that her head is facing toward the first user. A sensor may detect this head orientation of the second user. This head orientation may trigger the system to share the first user's music with the second user, for at least as long as this head orientation continues.

20 Claims, 8 Drawing Sheets

(56) References Cited

U.S. PATENT DOCUMENTS

| | | |
|---|---|---|
| 9,451,210 B1 | 9/2016 | Smus |
| 2003/0225834 A1 | 12/2003 | Lee et al. |
| 2005/0286546 A1 | 12/2005 | Bassoli et al. |
| 2007/0129006 A1 | 6/2007 | Goldberg et al. |
| 2009/0193138 A1 | 7/2009 | Capps |
| 2015/0341400 A1 | 11/2015 | Vong |
| 2017/0078825 A1 | 3/2017 | Mangiat et al. |

OTHER PUBLICATIONS

Baumann, S., et al., BluetunA: let your neighbour know what music you like; published in CHI '07 Extended Abstracts on Human Factors in Computing Systems, pp. 1941-1946, year 2007.

Hamanaka, M., et al., Concert viewing headphones; published in SIGGRAPH Asia 2013 Emerging Technologies Article No. 4, Nov. 2013.

Qvarfordt, P., et al., Conversing with the user based on eye-gaze patterns; published in CHI '05 Proceedings of the SIGCHI Conference on the Human Factors in Computing Systems, pp. 221-230, Apr. 2005.

Wang, J., et al., Genius-on-the-go: FM radio based proximity sensing and audio information sharing; published in SenSys '12 Proceedings of the 10th ACM Conference on Embedded Network Sensor Systems, pp. 363-364, Nov. 2012.

Mueller, F., et al., Transparent hearing; CHI EA '02 CHI '02 Extended Abstracts on Human Factors in Computing Systems, pp. 730-731, Apr. 2002.

Basu, S., et al., Smart headphones: enhancing auditory awareness through robust speech detection and source localization; published in Proceedings. (ICASSP '01), 2001 IEEE International Conference on Acoustics, Speech, and Signal Processing, May 2001.

Hamanaka, M., et al., Sound Scope Headphones: Controlling an Audio Mixer through Natural Movement; published in ICMC, Jan. 2006.

* cited by examiner

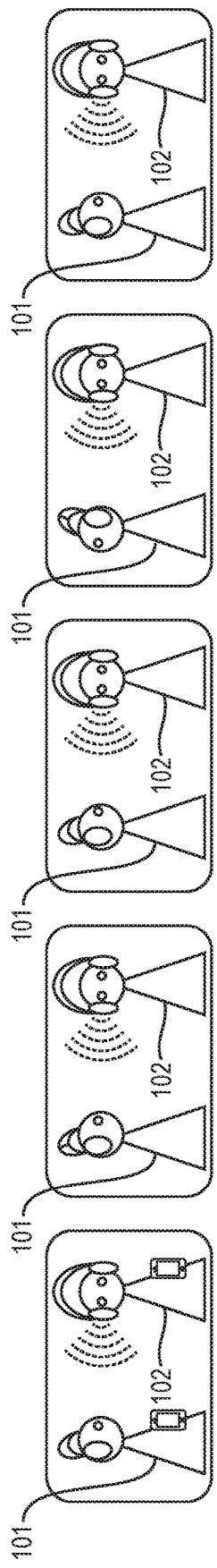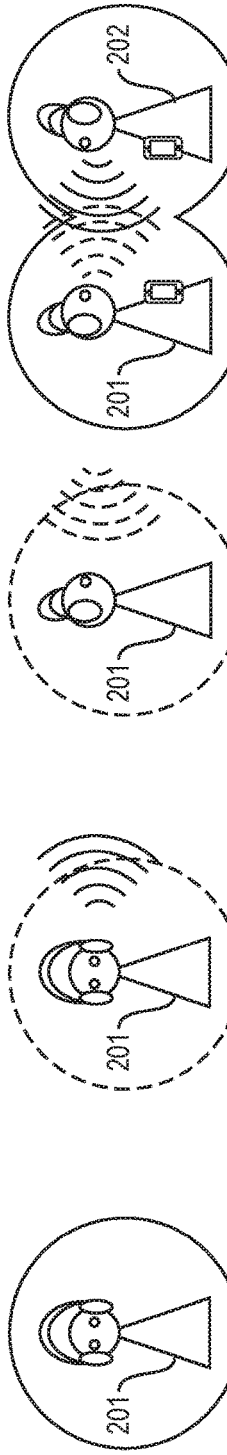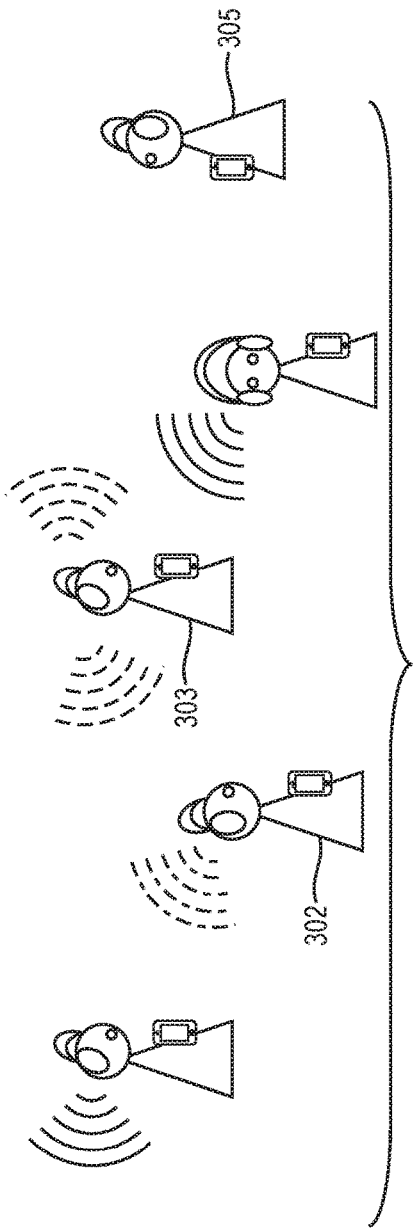

METHODS AND APPARATUS FOR SHARING OF MUSIC OR OTHER INFORMATION

RELATED APPLICATIONS

This application claims the benefit of U.S. Provisional Application No. 62/502,715 filed May 7, 2017 (the "Provisional").

FIELD OF TECHNOLOGY

The present invention relates generally to communication.

COMPUTER PROGRAM LISTING

The following ten computer program files are incorporated by reference herein: (1) audio_server.txt with a size of about 4900 bytes created on Mar. 8, 2018; (2) controller.txt with a size of about 2982 bytes created on Mar. 8, 2018; (3) index.txt with a size of about 1682 bytes created on Mar. 8, 2018; (4) Leaky_arduino_code.txt with a size of about 10,899 bytes created on Mar. 7, 2018; (5) leaky_server.txt with a size of about 721 bytes created on Mar. 4, 2018; (6) matrix.txt with a size of about 2619 bytes created on Mar. 8, 2018; (7) panning.txt with a size of about 4635 bytes created on Mar. 8, 2018; (8) pantest.txt with a size of about 10,866 bytes created on Mar. 8, 2018; (9) tracker.txt with a size of about 15,477 bytes created on Mar. 8, 2018; and (10) volume.txt with a size of about 3968 bytes created on Mar. 4, 2018.

SUMMARY

In illustrative implementations, a gesture (or combination of gestures) by one or more human users triggers sharing of music or other information.

In some implementations of this invention, head orientation is a factor (or one of a set of factors) that determines whether music or other information is shared.

In some cases, a first user hears a second user's music when the first user faces her head toward the second user. For instance, in some use scenarios: (a) a first user and a second user are both listening to music with their headphones; (b) a first user changes her head orientation, to face toward the second person for a period of time; (c) the first user begins to hear the second user's music (e.g., in response to the change in head orientation, the first user's headphone fades out the music that the first user was listening to and begins to play the music that the second user is listening to); (d) at least as long as the first user continues to face toward the second user; the first user continues to hear the second user's music; (e) the first user changes her head orientation again, to face away from the second user; and (f) shortly afterward, the first user ceases to hear the second user's music (e.g., in response to the new head orientation, the first user's headphones fade out the second user's music and begin to play other music).

Using head orientation as a trigger for sharing music (or other information) solves a problem that would otherwise occur if gaze direction were employed as the trigger for sharing. If a person were to stare (direct her gaze) at another person for a prolonged time, it would likely make both of them very uncomfortable, particularly if they were strangers to each other. Thus, requiring that a first person continue to look (direct her gaze) at a second person in order to continue to hear the second person's music would be impracticable in many scenarios. In contrast, in some implementations of this invention, a first person may avert her gaze (eye direction) so that she is no longer looking at a second person but may, at the same time, continue to face toward the second person (by causing the midsagittal plane of her head to continue to point toward the second person). This may cause the first user to continue to hear the second person's music. For instance, in some cases, if a first user wants to hear a second person's music (before initiating further social contact), the first user may orient her head toward the second user but avert her gaze by looking away (e.g., gazing down at her smartphone).

In some cases, sensors detect a combination (or temporal sequence) of a particular head orientation and one or more other user gestures. The system may analyze the detected gestures to determine whether to share or to continue to share music or other information. For instance, the gestures may comprise a combination (or temporal sequence) of one or more of the following: a particular head direction; nod head up and down; nod head left and right; raise eyebrows; smile; expose teeth; pucker lips (as though sending or "blowing" a kiss); stick out tongue; wink, hug; handshake; point at someone; high five; bow; kick; or provide a business card, phone number, email address or other contact information.

Using a combination (or temporal sequence) of gestures as a trigger for sharing (e.g., music or other information) solves a problem that would otherwise occur if only one gesture were employed as the trigger for sharing. The problem is that actual social interactions between persons typically involve multiple gestures over a period of time. If users are forced to rely on only one signal (e.g., head orientation only) over an extended period of time (e.g., more than five seconds), the users may feel uncomfortable. Conversely, allowing signaling by a combination (or temporal sequence) of gestures may facilitate a more natural, comfortable interaction in which people indicate an interest in sharing.

For instance, in some use scenarios, at least two gestures (at least one "positive" gesture by a first user and at least one "positive" gesture by a second user), may be required in order to trigger (or continue) sharing of music or other information. A "positive" gesture may be a gesture that indicates a user's (i) interest in another person, (ii) interest in interacting with another person, (iii) favorable reaction to another person, or (iv) favorable reaction to music or other information provided by another person.

In some cases, in order for gestures to trigger sharing of music or other information, the gestures must occur simultaneously or in a particular temporal order (and occur within a sufficiently small time window). For instance, in some implementations of this invention, sharing of music or other information between a first user and a second user is triggered if the first user makes any gesture in a first set of gestures and the second user simultaneously (or within a specified amount of time after the first user makes the gesture) makes any gesture in a second set of gestures. For instance, in some use scenarios, sharing of music or other information between the first and second users is triggered by the first user orienting her head so that it is facing toward a second user and the second user (simultaneously, or within a short time thereafter) smiling while facing the first user. In contrast, in some use scenarios, the reverse sequence of gestures (i.e., the second user smiling at the first user and then the first user turning her head to look at the second user) does not trigger sharing of music or other information. (This may be desirable, since if the first user is not facing the second user when the second user smiles, the first user may not see the second user's smile).

In some cases, once a particular temporal sequence of gestures occurs, sharing of music or other information may continue for a specified period of time even if both users discontinue, during the remainder of the period, the gestures that triggered the sharing. For instance, in some cases, if the two gestures that triggered music sharing were the first user facing toward the second user and the second user smiling back, then the music sharing may continue for the specified period even if the first user turns her head away or if the second user stops smiling. However, the specified time period may be cut short if any of certain termination events occur. For instance, a termination event that cuts short a specified period of sharing may comprise: (a) the physical distance between the two users increasing to more than a specified threshold; (b) a first user (who is receiving the music from another person) performing gesture(s) that indicate a desire to receive music from a different person instead; or (c) a user involved in the sharing making a "negative" gesture such as shaking her head from side to side (right to left and left to right) or frowning.

In illustrative implementations, sharing of music or other information may be limited by one or more privacy settings. For instance, in some cases, a user may select: (a) a "stand-alone" mode, in which her music is not transmitted to others and she does not hear music that others are listening to; (b) a "boom-box" mode, in which the music she is listening to is transmitted to others, but she does not hear other people's music; (c) a "curious" mode, in which she can hear music that another person is listening to without sharing; or (d) a "bidirectional mode", in which music may be transmitted to her headset or from her headset.

In some implementations of this invention, the gesture(s) (which trigger sharing of music or other information) may comprise a movement or orientation of a body part or may comprise a facial expression.

In some implementations of this invention, a wide variety of sensors may be employed to detect gestures (including tracking head orientation). For instance, in some cases, one or more of the following sensors may be employed: camera, video camera, webcam, accelerometer, gyroscope, magnetometer, infrared sensor, magnetic field sensor, proximity sensor, capacitive sensor, infrared (IR) position trackers (including IR receivers and IR transmitters), RFID (radio-frequency identification) tags and RFID reader(s).

In some cases, one or more of the sensors (a) are worn directly on the body of a human user; or (b) housed in a device (e.g., headset, wrist bracelet or arm bracelet) that is worn or carried by the user. Alternatively, in some cases, one or more of the sensors: (a) are located at a position that is remote from (e.g., 500 cm or more from) and external to a human user; and (b) are not worn or carried by the user.

For instance, in some cases, gestures are detected by a digital video camera is housed in a headset worn by each of the users, respectively. Alternatively, video cameras may be located in fixed positions external to the users. Computer vision software may be employed to detect gestures, by analyzing images captured by the camera(s).

In some cases, a headset houses accelerometers, gyroscopes, and magnetometers that detect head movements. Likewise, an armband or wristband may house accelerometers, gyroscopes, and magnetometers that detect movement of an arm or wrist.

In some cases, gestures are detected by measuring distance between an RFID tag and an RFID reader. For instance, RFID tags may be housed in a headset worn by a user or housed in garments worn by the user. In some cases, distance is measured between RFID tags worn by a first user and an RFID reader that is worn by the first user or by another user.

Likewise, gestures may be detected by measuring proximity or changes in magnetic field. For instance, in some cases, a user may wear both a magnetic field sensor and a ferrous magnet (e.g., a magnet in a headset and a magnetic field sensor in a wristband, or vice versa).

This invention has many practical applications. Here are some non-limiting examples:

Music Sharing: Music may be shared between users (e.g., when a first user faces her head toward a second person).

Information Sharing: In some implementations, information other than music is shared. For instance: (a) in a conference or other meeting, information about a first user (e.g., name, title, interests) may be shared with others who face toward the first user; (b) in a guided tour in an art museum, a user may hear the guide's talk only when the user is facing toward the guide; (c) in a classroom, a student may hear an explanation about the material being studied when she faces toward the blackboard or teacher; (d) in a commuting scenario, a first commuter may trigger sharing of music or other information by facing toward another commuter; (e) in a doctor's waiting room, a patient may hear information about the doctor's schedule (or waiting time), when the patient faces toward the doctor's receptionist; and (f) in the context of services for the visually blind, a blind person who is facing toward nearby user may hear information about the user even if the blind person does not see the user.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIGS. 1A, 1B, 1C, 1D, and 1E illustrate a two-person interaction.

FIGS. 2A, 2B, 2C, and 2D illustrate different privacy settings.

FIG. 3 illustrates a multi-user scenario.

Figure 4:
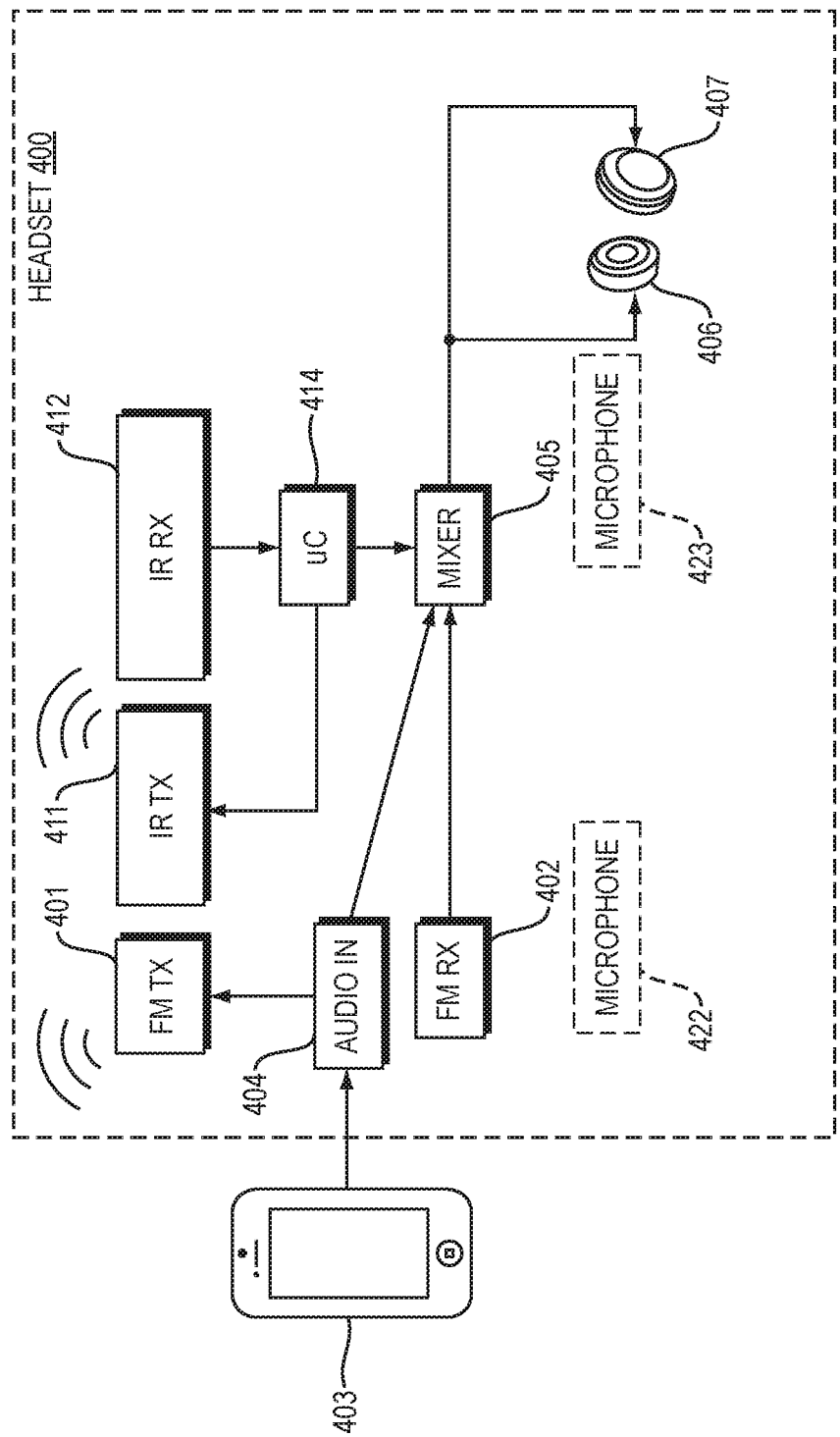
FIG. 4 illustrates hardware that is worn or carried by a user and that is configured to mix audio locally.

The above Figures show some illustrative implementations of this invention, or provide information that relates to those implementations. The examples shown in the above Figures do not limit this invention. This invention may be implemented in many other ways.

DETAILED DESCRIPTION

Conventional personal technologies (e.g., smartphones and headphones) have changed the way humans interact with each other. It is not unusual to see people texting and listening to music while being unaware of their surroundings or ignoring them. Despite sharing the same physical location, people in these situations are often not engaging in any kind of conversation or interaction with each other.

In illustrative implementations of this invention, a system for sharing music files or other information tends to solve, or at least mitigate, this problem (i.e., the isolating effect of some personal technologies).

In some implementations of this invention, a system: (a) includes a headset; and (b) shares of music or other information based on one or more detected gestures (e.g., head orientation). In some cases, the headset includes a directional receiver that detects the direction in which a person's head is facing (i.e., the direction in which the midsagittal plane of the person's head is pointing). In some cases, when a first person faces a second person, the music that the second person is listening to begins to mix as a sub layer in the first person's soundtrack (beneath the first user's original music). If the first person looks at that the second person long enough, the music that the first person hears may become entirely the music that the second person was originally listening to.

By sharing music, the two persons may share an interaction with each other. An "ice breaker" moment may be created that facilitates a conversation. Each person may learn something about the other, expanding his or her horizons in terms of music taste as well as people.

FIGS. 1A to 1E illustrate a two-person interaction, in an illustrative implementation of this invention. FIGS. 1A to 1E show a temporal sequence, in which FIGS. 1A and 1E are the beginning and end, respectively, of the sequence. In FIG. 1A, User A 101 faces toward User B 102, in such a way that the midsagittal plane of User A's head is pointed toward User B. In FIG. 1B, User A continues to face User B, and starts to hear User B's music (e.g., User A hears User A's original music begin to fade out and User B's music begin to fade in). In FIG. 1C, User A continues to face User B and hears only User B's music. In FIG. 1D, User A turns her head away from User B, in such a way that the midsagittal plane of her head ceases to point at User B. In FIG. 1E, User A continues to face away from User B, and User A stops hearing User B's music.

FIGS. 2A to 2D illustrate different privacy settings, in an illustrative implementation of this invention. In FIG. 2A, User C 201 has selected a "stand-alone" privacy setting, in which User C's music is not transmitted to other users and User C does not listen to other users' music. In FIG. 2B, User C has selected a "boom-box" privacy setting (also known as "transmit-only" privacy setting), in which User C's music is transmitted to other users but User C does not listen to other users' music. In FIG. 2C, User C has selected a "curiosity" privacy setting, in which User C's user's music is not transmitted to other users but User C may listen to other users' music. In FIG. 2D: (a) User C 201 and another user 202 have each selected a "bidirectional" privacy setting; and (b) as a result, User C and user 202 may each hear the other's music and the music of each of them may be transmitted to the other.

The following is a non-limiting example of how these privacy modes may be implemented. In this example: (a) each user's headset includes an FM radio transmitter and an FM radio receiver; and (b) the four privacy modes described above may be implemented by turning the FM transmitter on and off and the FM receiver on and off. In this example, if a user selects the "stand-alone" privacy mode, then the FM transmitter and the FM receiver in the user's headset may both be turned off. This "stand-alone" mode may prevent the first user's music from being transmitted to other users' headsets and may prevent the first user from hearing other users' music. In this example, if a user selects the "boom-box" privacy mode, then the FM transmitter in the user's headset may be turned on and the FM receiver in the user's headset may be turned off. This may cause the user's music to be transmitted to other user's headsets, but may prevent the user from hearing other users' music. In this example, if a user selects the "curiosity" privacy mode (also known as the receive-only mode), then the FM transmitter in the user's headset may be turned off and the FM receiver in the user's headset may be turned on. This may prevent the user's music from being transmitted to other user's headsets, but may enable the user to hear other users' music. In this example, if two users select a "bidirectional" privacy mode, then the FM transmitter and FM receiver in each of the two users' headsets may be turned on. This enables each member to hear the other's music.

In some cases, in bidirectional mode, both parties are willing to share and receive. For instance: (a) person A may be listening to music A and person B may be listening to music B; and (b) they may switch, and person A may listen to music B and person B may listen to music A. In some cases, in bidirectional mode, if person A is facing person B but person B is not facing person A, and if B was initially listening to music B, then person A may listen to music B and person B may listen to music B.

In some use scenarios, in which person A is in "boom-box" mode (transmit-only mode) and was initially listening to music A and person B is in "curiosity" mode (receive-only mode), then person A may listen to music A and person B may listen to music A.

In some use scenarios, (a) a first user's head is facing toward a set of multiple other users (e.g., e., the midsagittal plane of the first user's head is pointed toward a set of multiple people who are each at different physical distances from the first user); and (b) as a result, the first user hears the music of the person in the set who is closest (in physical distance) to the first user.

This invention is not limited to two-user interactions. In some cases: (a) each headset is both a radio station and a radio receiver; and (b) a multi-person interaction may be achieved in which (i) multiple users are facing toward the same person, all listening to the same audio content or (ii) multiple users share audio content with each other, in such a way that each user listens to someone else's music.

FIG. 3 illustrates a multi-user scenario, in an illustrative implementation of this invention. In the example shown in FIG. 3, more than two people are listening to the same music (users 302 and 305 are listening to user 303's music). Furthermore, in FIG. 3, different users are in different privacy modes.

In some implementations, a headset includes: (a) an infrared (IR) sensor for tracking head orientation; and (b) an FM transceiver for transmitting one's own music and tuning into the other person's music.

FIG. 4 illustrates hardware that is worn or carried by a user and that is configured to mix audio locally.

In the example shown in FIG. 4, a user (not shown) wears a headset 400 on her head and holds a smartphone 403 in her hand. Headset 400 includes an FM radio transmitter 401, an FM receiver 402, "audio in" circuitry 404, an audio mixer 405, headphones 406, 407, an IR transmitter 411, an IR receiver 412, and a microcontroller 414.

In FIG. 4, an electrical signal that encodes audio content is sent by smartphone 403 and is received by "audio in" circuitry 404 in headset 400. For example, the "audio in" circuitry 404 may include additional modulators and amplifiers. The "audio in" circuitry may be configured for Wi-Fi®, Bluetooth®, BLE (Bluetooth® Low Energy), or radio communication between headset 400 and smartphone 403 (or for any other communication between the headset and a mobile communication device). If FM transmitter 401 is turned on, then this audio content may be transmitted by FM transmitter 401 so that other persons in the vicinity (who are wearing similar headsets) may listen to this audio content. If some circumstances (e.g., if the user has selected a "stand-alone" or "boom-box" privacy mode), then the audio content may be sent to mixer 405 and played by headphones 406, 407 in such a way that the user listens to the audio content. In some cases, headphones 406, 407 comprise circumaural headphones (also known as over-ear headphones). Alternatively, headphones 406, 407 may comprise supra-aural headphones, earphones, earbuds, or in-ear headphones.

In some scenarios, in FIG. 4, IR transmitter 411 is an omnidirectional (e.g., 360 degree) transmitter and IR receiver 412 is a directional receiver. In these "directional receiver" scenarios: (a) a user may wear the directional IR receiver; and (b) the gain of signal of the directional IR receiver may be greatest in a direction that is parallel (or close to parallel) to the midsagittal plane of the user's head and that points outward from the user's face. In some cases, the directional IR receiver comprises an IR sensor housed in a tube. The longest dimension of the tube may be parallel (or close to parallel) to the midsagittal plane of the user's head. In these "directional receiver" scenarios: (a) multiple users may each, respectively, wear a headset of the type shown in FIG. 4; and (b) if a first user's directional IR receiver 412 receives a strong IR signal from a second user, this may mean that the first user is facing toward the second user.

Alternatively, in some scenarios, in FIG. 4, IR receiver 412 is an omnidirectional receiver and IR transmitter 411 is a directional transmitter. In these "directional transmitter" scenarios: (a) a user may wear the directional IR transmitter; and (b) the gain of the directional IR transmitter may be greatest in a direction that is parallel to the midsagittal plane of the user's head and that points outward from the user's face. Thus, the directional IR transmitter may emit IR light mostly in that direction. In these "directional transmitter" scenarios: (a) multiple users may each, respectively, wear a headset of the type shown in FIG. 4; and (b) if a first user's omnidirectional IR receiver receives a strong IR signal from a second user, this may mean that the second user is facing toward the first user.

In FIG. 4, IR transmitter 411 (which is worn by person A) transmits an IR signal that encodes the radio frequency at which person A's headset is transmitting audio content via FM radio. Person B's headset may, when it receives the IR signal: (a) tune into that frequency of FM radio; and (b) start mixing the audio content with music that person B is already listening to. After a period of time, person B may (in some cases) hear only what person A is hearing. If person B stops facing person A, then person B's headset may slowly return to playing person B's original music.

In FIG. 4, microcontroller 414 controls mixer 405 and IR transmitter 411, and interfaces with "audio in" circuitry 404.

Alternatively, or in addition, headset 400 may include microphones (e.g., 422, 423) that are configured to detect sounds that may be analyzed to detect the location of other users by sound localization.

Alternatively, in FIG. 4: (a) the FM transmitter 401 and FM receiver 402 may be replaced by a Bluetooth® transmitter and Bluetooth® receiver, respectively; and (b) audio content may be transmitted via Bluetooth® radio signals. Alternatively, in FIG. 4: (a) the audio content may be transmitted via any other type of signal, including Wi-Fi® signals, radio signals in other bands (such as AM), infrared signals, or inaudible ultrasonic sounds; and (b) the FM transmitter and FM receiver may be replaced by hardware configured to transmit this other type of signal.

Alternatively, in FIG. 4, mixer 405 and "audio in" circuitry 404 may be replaced by one or more computers that are programmed to perform software radio.

In the example shown in FIG. 4, audio signals are mixed locally by mixer 405 and the output of the mixing is heard only by the person who is wearing headset 400 (which houses mixer 405).

Detecting Gestures That Trigger Sharing of Music or Other Data

Figure 5A:
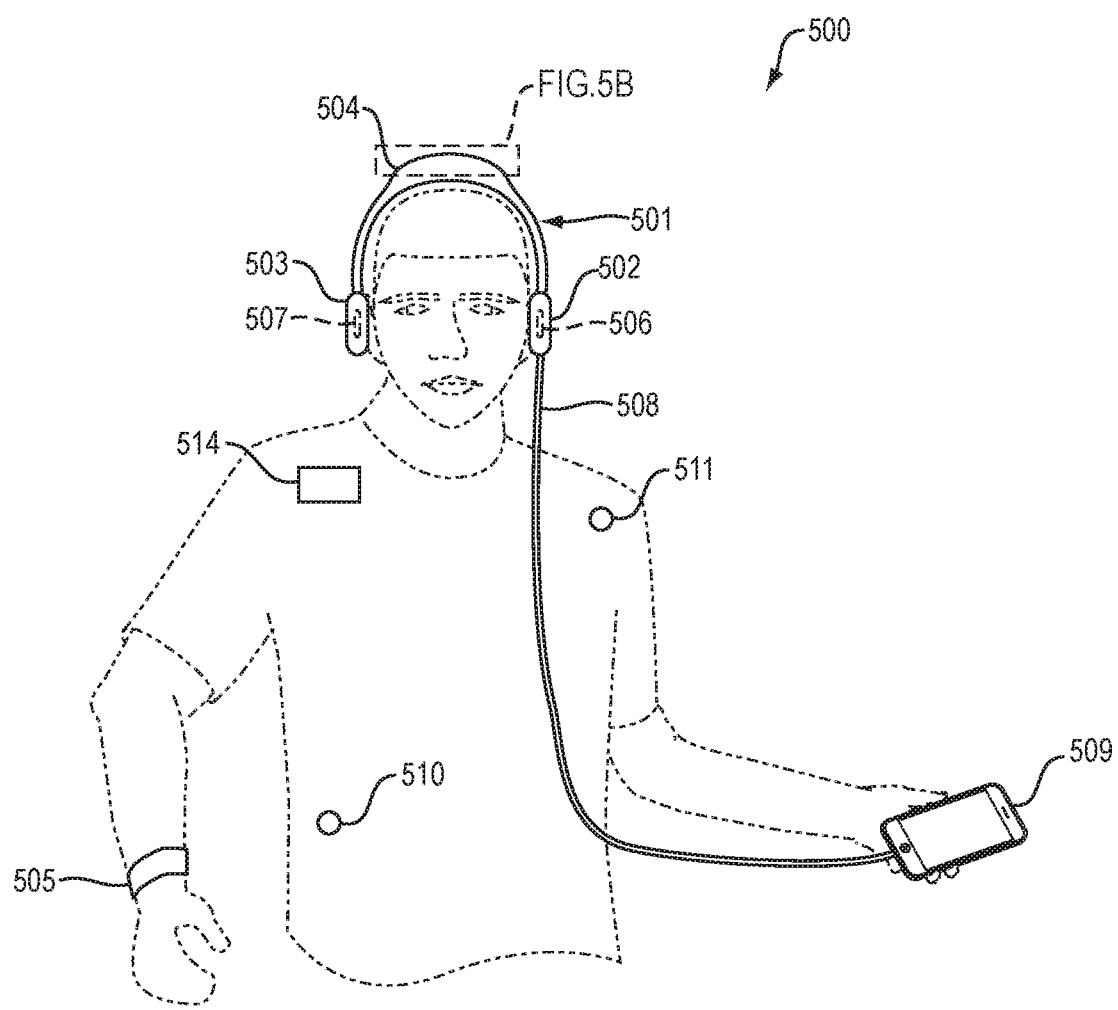
FIG. 5A illustrates multiple sensors worn by a user to detect gestures that signal a willingness to share music or other information.

FIG. 5A illustrates multiple sensors worn by a user to detect gestures. For instance, the detected signals may signal a willingness to share music or other information.

In the example shown in FIG. 5A, a user 500 wears a headset 501 that includes headphones 502, 503. These headphones include audio transducers (e.g., speakers) 506, 507 that may output music or other audible information in such a way that a human user hears the music or other audible information. An upper region 504 of headset 501 includes sensors and other equipment. User 500 is wearing a wristband 505 that also includes sensors. More detailed views of region 504 and wristband 505 are shown in FIGS. 5B and 5C, respectively.

In FIG. 5A, user 500 is wearing (attached to his shirt) two RFID passive tags 510, 511 and an RFID reader 514. User 500 holds a smartphone 509 in one of his hands, which is connected to headset 501 by a cord 508. In some cases, cord 508 provides a wired communication link (and optionally a wired power link) between smartphone 509 and headset 501.

Figure 5B:
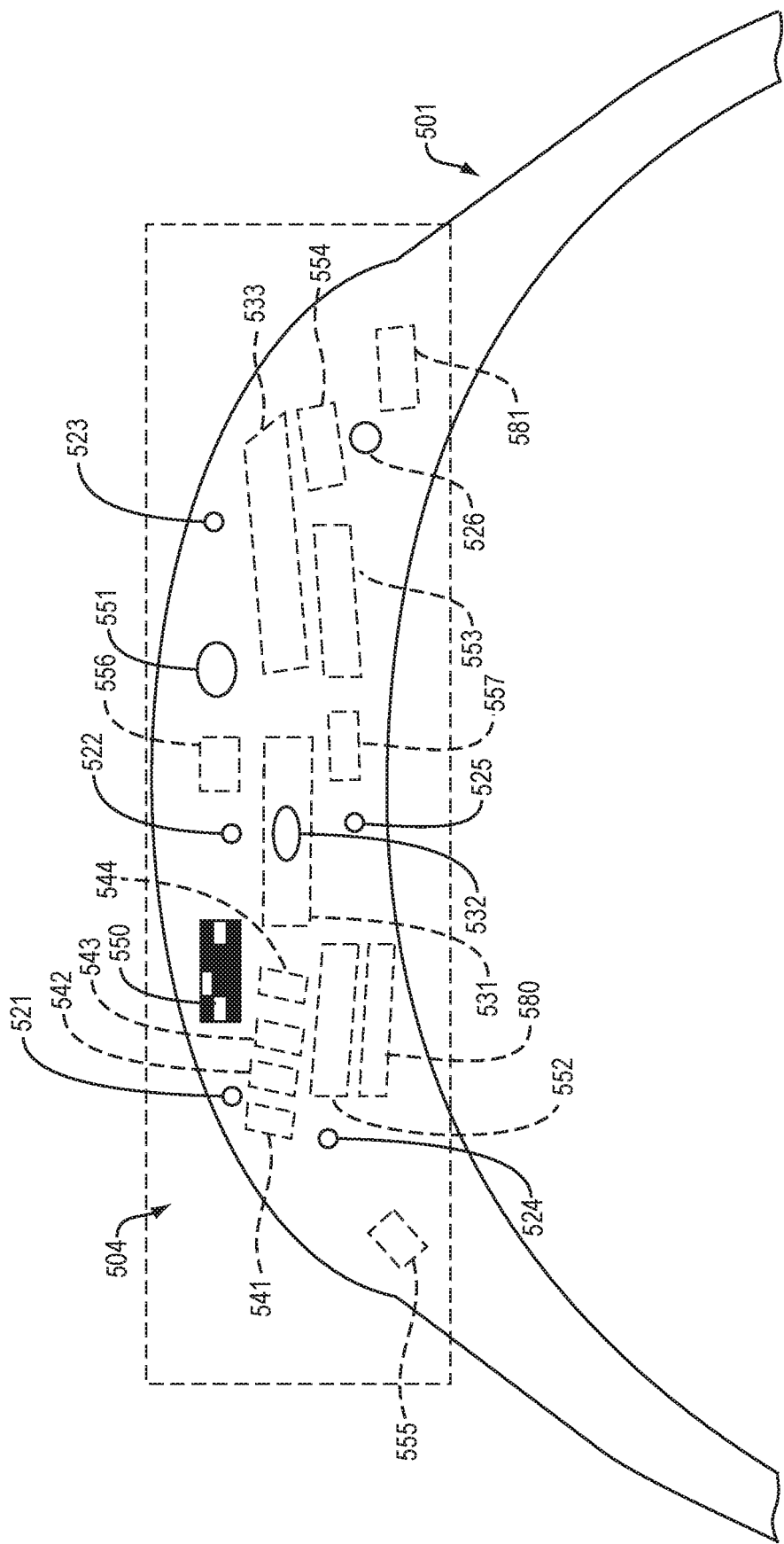
FIG. 5B illustrates a portion of a headset that is configured to, among other things, detect gestures that signal a willingness to share music or other information.
Figure 5C:
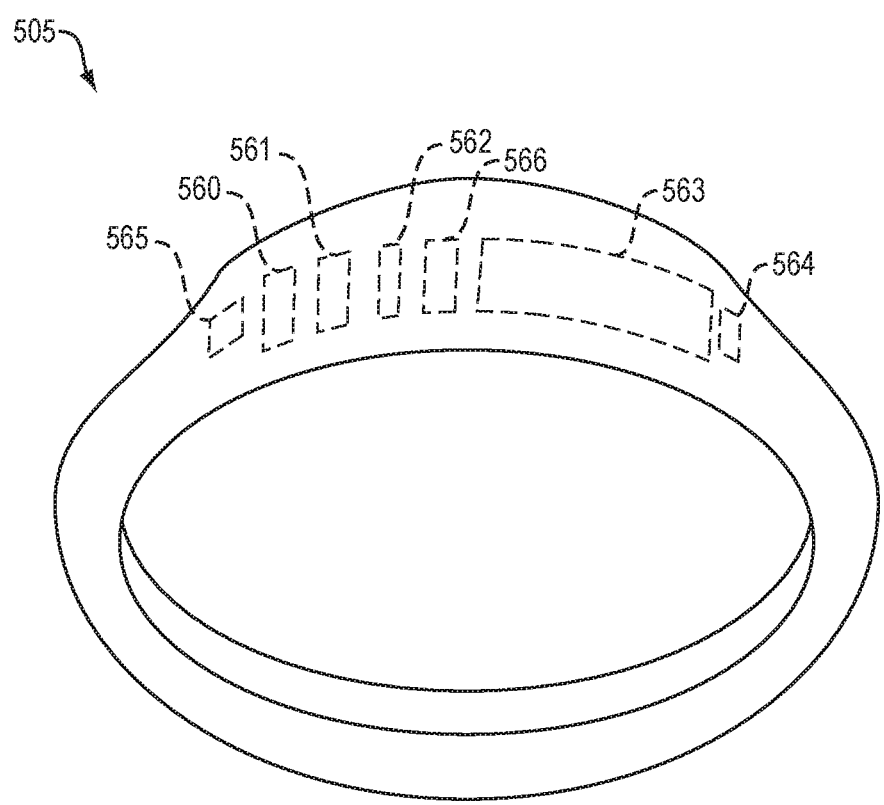
FIG. 5C illustrates a wristband that is configured to, among other things, detect gestures that signal a willingness to share music or other information.

FIG. 5B illustrates a portion of a headset that is configured to, among other things, detect gestures that signal a willingness to share music or other information.

In FIG. 5B, an upper portion 504 of a headset 501 houses a sensor module 533, as discussed in more detail below.

In FIG. 5B, headset 501 also houses a camera 531 and a camera lens 532. Camera 531 may comprise a digital video camera. An on-board computer 553 may analyze images captured by camera 531, in order: (a) to detect facial expressions or other gestures of nearby users; or (b) to track position of nearby users or to track the direction in which other users' heads are facing. Alternatively, this computer vision analysis may be performed by a remote computer. In some cases, headset 501 includes a visual fiducial pattern 550. This fiducial 550 may make it easier for a camera to visually track position or orientation of headset 501 (and thus track the position and orientation of the head of the person who is wearing headset 501).

In FIG. 5B, headset 501 also houses "audio in" circuitry 580 and an audio mixer 552. For example, mixer 552 may mix signals derived from (a) FM radio transmissions and (b) audio content provided by smartphone 509.

In FIG. 5B, headset 501 also houses an IR tracking system that is configured to track head orientation. The IR tracking system includes an IR transmitter 541 and an IR receiver 543.

In some cases, in FIG. 5B, IR transmitter 541 is an omnidirectional transmitter and IR receiver 543 is a directional receiver. In these "directional receiver" cases, when a directional IR receiver worn by a first user receives a strong IR signal from a second user, this may indicate that the first user is facing toward the second user.

In some other cases, IR transmitter 541 is a directional transmitter and IR receiver 543 is an omnidirectional receiver. In these "directional transmitter" cases, when an omnidirectional IR receiver worn by a first user receives a strong IR signal from a second user, this may indicate that the second user is facing toward the first user.

Alternatively or in addition, in FIG. 5B, headset 501 may include a set of multiple IR sensors (e.g., 521, 522, 523, 524, 525, 526) that are positioned in different locations on headset 501, in such a way that which of these IR sensors detect an IR signal may depend on the angle at which the IR signal is approaching headset 501. For instance, in some cases, the multiple IR sensors (e.g., 521, 522, 523, 524, 525, 526) comprise sensors that are a part of a Vive® tracker that detects IR signals from multiple Vive® "lighthouses" that are positioned in fixed locations in the first user's environment. Each of these "lighthouses" may periodically emit a sweeping beam or plane of IR light. Based on the time at which a sweeping beam or plane of IR light emitted by a "lighthouse" is detected at one of the IR sensors (e.g., 521, 522, 523, 524, 525, 526) in headset 501 and based on the known locations of the "lighthouses": (a) the position of the first user (who is wearing headset 501) may be determined; and (b) the head orientation of the first user may be determined.

In FIG. 5B, headset 501: (a) is worn by a first user (not shown); and (b) houses one or more LED (light emitting diode) displays. In FIG. 5B, LED display 551 is sufficiently bright and sufficiently large to be visible to other nearby users. The state of LED display 551 (e.g., whether LED(s) are on or off, what color(s) of light are being displayed by the LED(s), whether light emitted by the LEDs is bright or dim, or whether the light emitted by the LED(s) is blinking or steady, and if blinking, the rate of blinking) may visually encode information regarding the status or operation of headset 501. For example, the state of LED display 551 may visually encode information regarding the privacy mode that has been selected by the first user. For instance, if LED display 551 is displaying a blinking green light, this may be a signal that indicates that the user has selected a "bidirectional" privacy mode.

In FIG. 5B, headset 501 houses an FM transmitter 542 and an FM receiver 544. Whether these are "on" or "off" may depend on the privacy setting that has been selected by the user wearing headset 501.

FIG. 5C illustrates a wristband that is configured to, among other things, detect gestures that signal a willingness to share music or other information. In FIG. 5C, a wristband 505 is configured to be worn around a user's wrist. Wristband 505 houses a sensor module 563, a passive RFID tag 564, a ferrous magnet 565, a wireless module 560, a computer 561, a memory device 562, and a battery 566.

In FIGS. 5B and 5C, headset 501 and wristband 505 each, respectively, house a sensor module. This sensor module (533 or 563) may include one or more accelerometers, gyroscopes and magnetometers that are configured to detect head motions by a user who is wearing the headset (such as nodding the head up and down or nodding the head side-to-side). Also, for example, the sensor module (533 or 563) may include a proximity sensor, a capacitive sensor or a magnetic field sensor. For instance, the proximity sensor, capacitive sensor or magnetic field sensor may be configured to detect: (a) a handshake by two users; (b) a high-five gesture in which a hand of a first user touches a hand of a second user; or (c) other gestures by the wearer of headset 501 or by other nearby users.

In FIGS. 5B and 5C, headset 501 and wristband 505 each, respectively, house one or more passive RFID tags. These RFID tags (556 or 564) may be employed for gesture detection. For instance, one or more RFID tags may be used to detect proximity to an RFID reader (e.g., 514).

In FIGS. 5B and 5C, headset 501 and wristband 505 each, respectively, house a ferrous magnet. This ferrous magnet (555 or 565) may be employed to detect gestures. For instance, this magnet (555 or 565): (a) may be housed in headset 501 or wristband 505 which is worn by a first user; and (b) may create a magnetic field that is sensed by a magnetic field sensor that is worn on another portion of the first user's body or that is worn by a different person.

In FIGS. 5B and 5C, a computer (553 or 561) may comprise a microcontroller and may store data in, and retrieve data from, a memory device (554 or 562). The headset 501 or wristband 505 may include one or more batteries (557 or 566) that provide power. The headset 501 or wristband 505 may also include a wireless module (560 or 581) for wireless communication with other devices.

Centralized Functions

In some implementations, each of a set of functions (e.g., audio mixing, transmission of signals that encode audio content) is performed locally by each of the headsets in the system, respectively. For example, the headset in FIG. 4 may locally perform (on the headset itself): (a) audio mixing; and (b) transmission of signals that encode audio signals.

Alternatively, in some implementations, one or more system functions are performed in a centralized manner by centralized hardware, instead of being performed locally by each headset in the system. For instance, the centralized functions may include certain computer processing tasks, audio mixing, or transmission or receipt of signals that encode audio content. The centralized hardware may include one or more central computers, antennas or signal processors.

Figure 6:
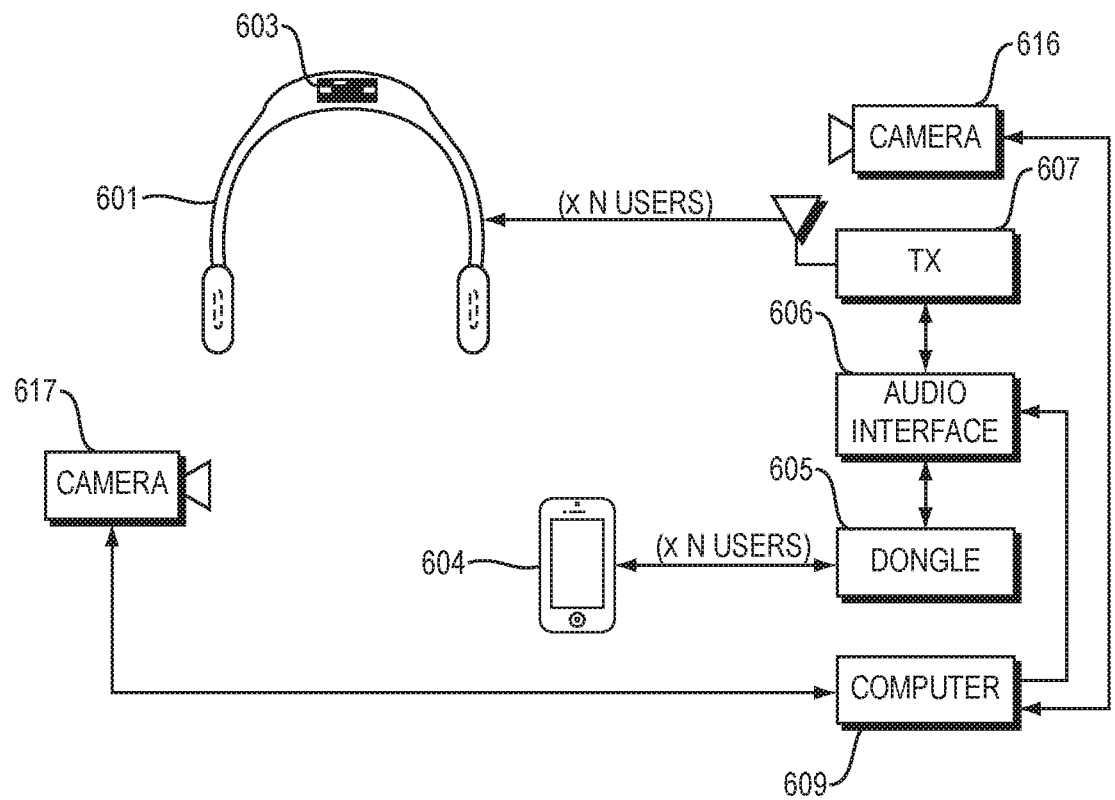
FIG. 6 illustrates a hardware configuration in which gestures are detected by computer vision and certain functions (e.g., audio mixing) are performed centrally.
Figure 7:
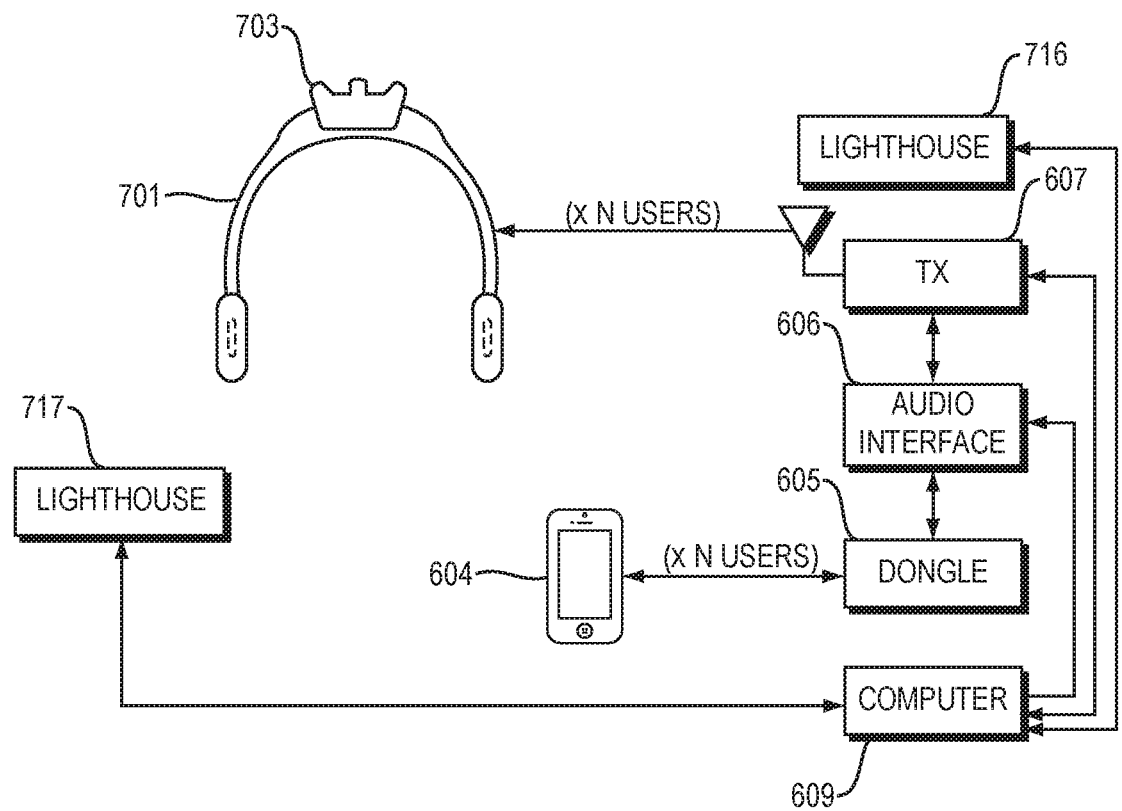
FIG. 7 illustrates a hardware configuration in which head orientation is tracked by Vive® infrared trackers and certain functions (e.g., audio mixing) are performed centrally.

FIGS. 6 and 7 illustrate hardware configurations in which certain system functions are centralized.

In FIGS. 6 and 7: (a) a central computer may detect head position and orientation with the assistance of a camera or a Vive® tracking system; and (b) audio mixing may be performed by a central computer with the assistance of an audio interface (e.g., a sound card with multiple IO).

In the examples shown in FIGS. 6 and 7, software for centralized functions may be written in Javascript® (e.g., node.js and socket io) and Python™. For instance, a Node.js server and a set of socket io clients may be employed. The server and clients may communicate via events. A Python™ script may comprise a web socket client as well, and may receive the data from a first event and may control a sound card with multiple inputs and outputs. Another Python™ script which is also a web socket client may receive the tracking data through SteamVR® and may transmit this data through a second event to the rest of the clients.

In the examples shown in FIGS. 6 and 7, tracking of a user's head orientation may be performed by: (a) Vive® tracking; (b) a camera and computer vision software; or (c) any other tracking system.

In the examples shown in FIGS. 6 and 7, music "mixing" and distribution may be performed with a multi-input multi-output sound card and a Python™/Javascript® script. For example: (a) a Bheringer F1616 audio interface may be employed; and (b) the sound card may be controlled using webAudio Api: https://developer.mozilla.org/en-US/docs/Web/API/Web_Audio_API or by using a dedicated Python® audio streaming library such as: https://python-sounddevice-.readthedocs.io/en/0.3.10/. This portion of the code may handle receipt of incoming audio inputs and distribution of music to the correct output channels of the audio interface corresponding to the different users, based on an external input from the tracking system.

In the examples shown in FIGS. 6 and 7, music acquisition may be performed centrally. For instance, music acquisition may be performed (e.g., with WiFi® streaming) by Chromecast® devices connected to the audio interface in the correct input channel. Each user, respectively, may cast her music (e.g., with Google Play® or YouTube®). This may also be performed by using an FM dongle on the user side and an FM receiver connected to the audio interface input side. Alternatively, this may be achieved by connecting a Bluetooth® receiver to the audio interface side and transmitting audio from a personal device with Bluetooth® transmitting capabilities such as a phone, or using an external Bluetooth® transmitter.

In the examples shown in FIGS. 6 and 7, audio redistribution may be performed centrally. In some cases, the audio comprises music or a person's voice. For example: (a) a first user may be listening to music, and this music may be streamed in real time, so that a second user may hear the music when the second person is facing the first user; or (b) a first user's speech may be streamed in real time, so that a second user may hear the first user's speech when the second user is facing the first user.

In FIGS. 6 and 7, audio from the corresponding outputs of the audio interfaces may be sent via Bluetooth® to each user. Each user's headset may be casting music via Wi-Fi®, with the Bluetooth® headset disconnected from the user's phone. Each user's headset may be looking for a second device in its Bluetooth® pairing list. This may be an audio stream coming from a Bluetooth® transmitter. The Bluetooth® transmitter may be a dedicated Bluetooth® transmitter or may be a stationery phone located in the "central hub" where the computer and sound card are located. This may make pairing of multiple headsets easier.

FIG. 6 illustrates a hardware configuration in which gestures are detected by computer vision and certain functions (e.g., audio mixing) are performed centrally.

In FIG. 6, each user, respectively, wears a headset 601 that houses a visual fiducial 603 (also called a visual marker). Fiducial 603 may include a binary visual pattern (such as a black-and-white pattern) that is clearly visible, in order to facilitate visual tracking by computer vision. In some cases, each fiducial, respectively, visually encodes a number that uniquely identifies the fiducial (and thus uniquely identifies the headset that houses the fiducial). In some cases, fiducial 603: (a) comprises a 5×5 cm² image of a 7×7 black and white pixel array; and (b) is printed on cardboard and mounted on the headset.

In FIG. 6, digital video cameras 616 and 617 include wide-angle lens and capture images of scene. In FIG. 6, computer 609 analyzes these images (e.g., by executing computer vision software) to detect a fiducial on each headset in the scene, respectively. In FIG. 6, computer 609 employs computer vision software to detect, for each fiducial respectively, the fiducial's unique ID number and the head orientation of the user who is wearing the headset that houses the fiducial. In FIG. 6, computer 609 may employ a JS-aruco software library that implements computer vision in Javascript®.

FIG. 7 illustrates a hardware configuration in which head orientation is tracked by Vive® infrared trackers and certain functions (e.g., audio mixing) are performed centrally.

In FIG. 7, each user, respectively, wears a headset 701 that houses a Vive® IR tracker 703. Each Vive® tracker 703 detects IR signals from Vive® lighthouses 716, 717 that are positioned in fixed locations in the user's environment. Each of the lighthouses 716, 717, respectively, may periodically emit a sweeping beam or plane of IR light. Position and orientation of each Vive® tracker may be calculated based on: (a) the time at which a sweeping beam or plane of IR light emitted by a lighthouse is detected at an IR sensor of the Vive® IR tracker 703; and (b) the known locations of lighthouses 716, 717. Thus: (a) the position of a user (who is wearing a headset that houses the Vive® tracker) may be determined; and (b) the head orientation of the user may be determined.

In the example shown in FIG. 7, a Vive® tracker 703 together with SteamVR® software provides accurate localization of users in a region that is illuminated by one or more Vive® lighthouse base stations 716, 717. Each Vive® tracker (e.g., 703) may provide information about the spatial location and angular orientation of the tracker relative to the base station. From this information, the spatial coordinates and angular orientation of the user's head may be calculated.

In FIGS. 6 and 7: (a) input music streams to an audio interface 606 may be received by Chromecast® audio via an audio cable; (b) output of audio interface 606 may be transmitted via transmitter 607 and paired with a headset; (c) transmitter 607 may be a Bluetooth® transmitter; and (d) the firmware of the headset may have two devices in its Bluetooth® pairing list.

In FIGS. 6 and 7, when a user selects a privacy mode that involves transmitting music to others (e.g., "boom-box" mode or "bidirectional" mode): (a) the music may be cast using Chromecast®; (b) a Bluetooth Connection® between headset and the user's phone may be disconnected; and (c) transmitter 607 may transmit music from audio interface 606.

In FIGS. 6 and 7, computer 609 controls and receives signals from an audio interface 606. This audio interface 606 in turn controls the mixing of different inputs assigning the music to different outputs which are in turn transmitted (e.g., via Bluetooth®) to the different users' headsets. For instance, the outputs of the audio interface 606 may be transmitted by transmitter 607 to each of N users, respectively.

In FIGS. 6 and 7, a dongle 605 may receive, from N smartphones 604 carried by N users, respectively, signals that encode audio content. For instance, dongle 605 may comprise a Chromecast® device.

Prototype

The following seven paragraphs describe a prototype of this invention.

In this prototype, the system facilitates content sharing based on the head direction of each of the users, respectively.

In this prototype, a directional IR receiver and omnidirectional IR transmitter are housed in a headset worn by a first user. Likewise, a directional IR receiver and omnidirectional IR transmitter are housed in a headset worn by a second user. These IR receivers and IR transmitters may be employed: (a) to detect whether the first user is facing toward the second user; and (b) whether the second user is facing toward the second user. The IR transmitter in the first user's headset may communicate the identity of the FM transmission channel in which the first user's headset is transmitting an FM signal that encodes audio content. The IR transmitter in the second user's headset may communicate the identity of the FM transmission channel in which the second user's headset is transmitting an FM signal that encodes audio content.

In this prototype, a highly directional receiver is employed for signal detection and an omnidirectional transmitter for the transmission of the information. The directional receiver comprises an IR receiver housed in an inch-long brass cylinder. The omnidirectional transmitter comprises a 940 nm IR (infrared) LED (light-emitting diode), equipped with an omnidirectional lens. Light sanding of the lens resulted in diffusion of the emitted light and increased transmission angle in the z axis. The identity of each user is encoded in the IR transmission using the NEC protocol. Each headset transmits a unique code in the range of 87.9-107.9 MHz. This frequency band (87.9-107.9 MHz) is also used by that same headset in order to transmit audio via FM radio.

In this prototype, each user's headset houses: (a) an FM transmitter that is configured to transmit a wireless audio signal; and (b) an FM receiver that is configured to receive a wireless audio signal. For instance, the FM receiver housed in a headset worn by a first user may tune into and receive an FM signal transmitted by a second user, after the system detects that the first user is facing the second user.

In this prototype, the FM radio receiver module is based on the Sparkfun Electronics® si4703 tuner chip and the FM radio transmitter is based on the Adafruit® si4713 transmitter chip. The FM transmitter transmits the personal audio source (e.g., the audio from the user's phone or media player) in a predetermined frequency (e.g., the personal frequency) and the FM receiver receives FM audio at a frequency determined by the IR input, coming from a microcontroller (Arduino® Mini).

In this prototype, a mixer stage mixes external and personal audio sources and a microcontroller (Arduino® Mini) controls hardware in the system.

In this prototype, mixing of the audio inputs (external and personal) is performed by a PCB (printed circuit board) with two dual channel 10K digital potentiometers. One dual potentiometer was used for right ear audio input and one for left ear audio input. Thus, personal and external audio sources are mixed for each ear separately. The mixing scheme may be linear, with control over duration of the transition between audio sources. The IR receiver may look for a continuous signal to determine that the user is still looking at the other transmitting user. If the signal is lost for a period longer then a specified time, the audio may fade back to the original audio source.

The prototype described in the preceding seven paragraphs is a non-limiting example of this invention. This invention may be implemented in many other ways.

Software

In the Computer Program Listing above, ten computer program files are listed. These ten computer program files comprise software employed in a prototype implementation of this invention. To run the audio_server and leaky_server files as Python™ software files, the filename extension for each may be changed from ".txt" to ".py" and appropriate software libraries may be installed in a working directory. To run the Leaky_arduino_code file as an Arduino® sketch program, the filename extension may be changed from ".txt" to ".ino" and appropriate software libraries be installed. To run the other seven files as .html files, the filename extension for each of these other seven files may be changed from ".txt" to ".html".

In some implementations of this invention, a least a portion of the software is written in Javascript® and HTML (e.g., node js and socket io) and Python™. For instance, a Node.js server and a set of socket io clients (e.g., "panning control", "volumes view", "tracker control" and "matrix view") may be employed. The server and clients may communicate via events (e.g., "leakyStatus" and "leakyControl"). A Python™ script (audioserver.py) may comprise a web socket client and may receive data from the leaky status event and may control a sound card with multiple inputs and outputs. Another Python™ script which is also a web socket client (leaky_server.py) may receive the tracking data through SteamVR® and may transmit this data through "leakyControl" events to the rest of the clients.

In some implementations of this invention, the software files that handle detection of head orientation and position are "js-aruco" (for computer vision-based detection) and leaky_server.py (for Vive® tracking control).

In some implementations of this invention, a computer performs a software program, which controls receipt of incoming audio inputs and controls distribution of music to the correct output channels of the audio interface corresponding to the different users, based on an external input from the tracking system. In some implementations, the software described in the preceding sentence comprises: (a) the "pantest" program (for a computer vision approach); and (b) the "audio_server" file (for a Vive® approach).

In some implementations the software code uses libraries, including: (1) Adafruit® IR library; (2) Sparkfun Electronics® FM receiver library; (3) Adafruit® FM transmitter library; and (4) mcp42010 digital potentiometer library This invention is not limited to the software described above. Other software may be employed. Depending on the particular implementation, the software used in this invention may vary.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with hardware, including one or more sensors, transmitters, receivers and mixers; (2) to control sharing of audio content; (3) to receive data from, control, or interface with one or more sensors; (4) to perform any other calculation, computation, program, algorithm, or computer function described or implied herein; (5) to receive signals indicative of human input; (6) to output signals for controlling transducers for outputting information in human perceivable format; (7) to process data, to perform computations, and to execute any algorithm or software; and (8) to control the read or write of data to and from memory devices (tasks 1-8 of this sentence referred to herein as the "Computer Tasks"). The one or more computers (e.g., 414, 553, 561, 609) may, in some cases, communicate with each other or with other devices:

(a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 414, 422, 423, 510, 511, 514, 531, 533, 553, 561, 563, 609) are configured for wireless or wired communication with other devices in a network.

For example, in some cases, one or more of these electronic devices each include a wireless module for wireless communication with other devices in a network. Each wireless module (e.g., 560, 581) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 414, 553, 561, 609) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

More Details

Figure 8A:
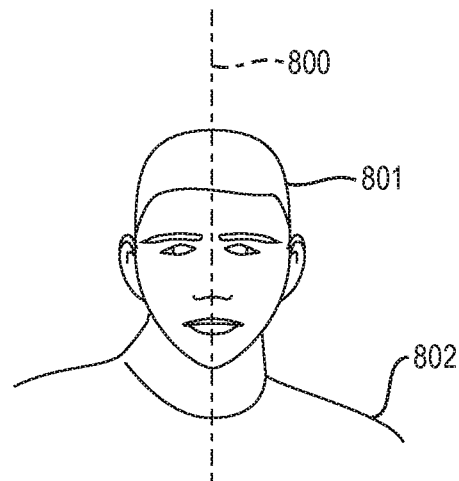
FIG. 8A shows a midsagittal plane of a head.

FIG. 8A shows a midsagittal plane 800 of a head 801 of a person 802. The midsagittal plane is in the midline of the head, runs from back to front of the head, and bisects the head into right and left sides. If a user turns his head to the left or to the right, without moving the rest of his body, then the midsagittal plane of his head will change orientation relative to the rest of his body.

Figure 8B:
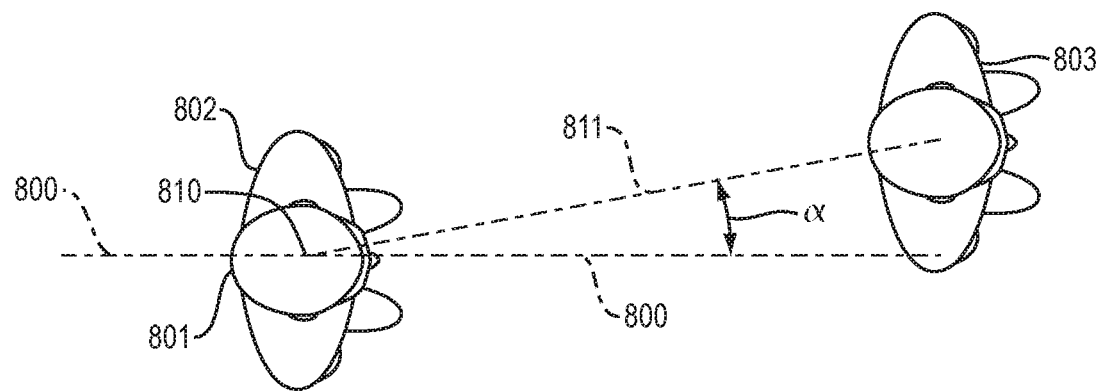
FIG. 8B shows a first person facing toward a second person.

FIG. 8B shows a first person 802 facing toward a second person 803. An angle $\alpha$ is formed by (a) vertex 810 (which is located in the head 801 of person 802); (b) midsagittal plane 800 (i.e., the midsagittal plane of the head 801 of person 802); and (2) a straight line segment 811 that starts at vertex 810 and ends at a point in the head of user 803. In some cases, angle $\alpha$ is greater than or equal to zero degrees and less than or equal to 30 degrees.

A non-limiting example of person A "facing toward" person B (or "facing" person B) occurs when the midsagittal plane of person A's head is pointing toward person B. A non-limiting example of user A "facing toward" user B (or "facing" user B) occurs when user A's head is oriented toward user B. A non-limiting example of person A "facing away" from person B occurs when the midsagittal plane of person A's head is pointing away from person A.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To "audibly present" audio content to a user means to output the audio content in such a way that the user hears the audio content.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; and (j) a depth camera. A camera includes any computers or circuits that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

A non-limiting example of a "computer vision" algorithm, as that term is used herein, is an algorithm that performs one or more of the following: digital image processing, image analysis, and computer vision.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period. To say that an event occurs "during" a time period does not create any implication regarding whether the event occurs outside the time period. For instance, if X occurs "during" a particular time period, then X may also occur at times other than the particular time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed "Infrared receiver" or "IR receiver" means a receiver (or transceiver) that is configured to receive infrared radiation.

"Infrared transmitter" or "IR transmitter" means a transmitter (or transceiver) that is configured to transmit infrared radiation.

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display "IR" means infrared.

The term "or" is inclusive, not exclusive. For example, A or B is true if A is true, or B is true, or both A or B are true. Also, for example, a calculation of A or B means a calculation of A, or a calculation of B, or a calculation of A and B.

To say that user X's head is "oriented toward" user Y means that an angle exists that satisfies all of the following conditions: (a) the angle is less than or equal to 30 degrees; and (b) the angle is formed by (i) a vertex that is located in user X's head, (ii) the midsagittal plane of X's head, and (iii) a straight line segment that starts at the vertex and ends at a point in Y's head.

A parenthesis is simply to make text easier to read, by indicating a grouping of words. A parenthesis does not mean that the parenthetical material is optional or may be ignored.

As used herein, the term "set" does not include a group with no elements.

Unless the context clearly indicates otherwise, "some" means one or more.

As used herein, a "subset" of a set consists of less than all of the elements of the set.

The term "such as" means for example.

To say that a machine-readable medium is "transitory" means that the medium is a transitory signal, such as an electromagnetic wave.

A non-limiting example of a user "wearing" Y is the user wearing a device that houses Y. Another non-limiting example of a user "wearing" Y is the user wearing a garment that houses Y. Another non-limiting example of a user "wearing" Y is the user wearing Y while Y directly touches the user's skin.

Except to the extent that the context clearly requires otherwise, if steps in a method are described herein, then the method includes variations in which: (1) steps in the method occur in any order or sequence, including any order or sequence different than that described herein; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) causing audio content to be audibly presented to a first user; (b) detecting a set of one or more gestures, which set includes a first gesture that comprises a second user's head being oriented toward the first user; (c)

performing a calculation to determine whether a first privacy setting and a second privacy setting permit the audio content to be shared with the second user, the first and second privacy settings having been selected by the first and second users, respectively; and (d) if the calculation determines that the first and second privacy settings permit the first audio content to be shared with the second user, (i) wirelessly transmitting a radio signal that encodes the audio content, (ii) causing a receiver worn by the second user to tune to the radio signal, and (iii) causing the audio content to be audibly presented to the second user during a time period in which the first gesture occurs. In some cases, the first gesture is detected by: (a) transmitting, with an omnidirectional transmitter worn by the first user, an infrared signal; and (b) receiving, with a directional receiver worn by the second user, the infrared signal. In some cases, the first gesture is detected by: (a) transmitting, with a directional transmitter worn by the second user, an infrared signal; and (b) receiving, with an omnidirectional receiver worn by the first user, the infrared signal. In some cases, the first gesture is detected by: (a) capturing, with one or more cameras, a set of images of a scene, which scene includes the first and second users; and (b) performing a computer vision algorithm to detect the first gesture, based on the set of images. In some cases, the first gesture is detected by: (a) emitting, from a first infrared transmitter, a first pattern of infrared light that periodically sweeps across a scene, which scene includes the first and second users; (b) emitting, from a second infrared transmitter, a second pattern of infrared light that periodically sweeps across the scene; (c) detecting a first time at which the first pattern of infrared light is incident on infrared sensors that are worn on the first user's head; (d) detecting a second time at which the second pattern of infrared light is incident on infrared sensors that are worn on the first user's head; (e) detecting a third time at which the first pattern of infrared light is incident on infrared sensors that are worn on the second user's head; (f) detecting a fourth time at which the second pattern of infrared light is incident on infrared sensors that are worn on the second user's head; and (g) calculating position and orientation of the second user's head relative to the first user's head, based on the first, second, third and fourth times. In some cases: (a) the radio signal that encodes the audio content is transmitted at a first frequency; and (b) the method further includes (i) transmitting, by an infrared transmitter worn by the first user, a second signal that encodes the first frequency, and (ii) receiving, by an infrared receiver worn by the second user, the second signal. In some cases: (a) the radio signal that encodes the audio content is transmitted at a first frequency; and (b) the method further includes (i) transmitting a second signal that encodes the first frequency, and (ii) receiving, by a receiver worn by the second user, the second signal. In some cases, the wireless transmitting of the radio signal that encodes the audio content is performed by a transmitter worn by the first user. In some cases, the wireless transmitting of the radio signal that encodes the audio content is performed by a transmitter that is more than one meter away from each of the first and second users. In some cases, the method includes mixing, by a mixer worn by the second user, audio signals. In some cases: (a) the method includes mixing, by a mixer, audio signals; and (b) the mixer is more than one meter away from each of the first and second users. In some cases, the detecting includes detecting, at a time after the first gesture starts, one or more of the following gestures by the first user: smile, nodding head up and down, or thumbs up. In some cases, the detecting includes detecting, at a time after the first gesture starts, one or more of the following gestures by the second user: smile, nodding head up and down, or thumbs up. In some cases, the detecting includes detecting, at a time after the first gesture starts, one or more of the following gestures: (a) the first and second users shaking hands, or (b) the first and second users high-fiving each other. In some cases: (a) the set of one or more gestures includes multiple gestures by the first or second users; and (b) the multiple gestures are detected by analyzing images captured by one or more cameras. In some cases, the detecting includes capturing an image of the first user while (i) the first user is smiling and (ii) the first and second users are facing each other. In some cases, the detecting includes capturing images of the first and second users while the first user nods the first user's head and simultaneously the first and second users are facing each other. In some cases, the detecting includes: (a) detecting, by one or more accelerometers, gyroscopes or magnetometers that are worn by the first user, nodding of the first user's head; and (b) simultaneously detecting that the first and second users are facing each other. In some cases, the detecting includes detecting the first and second users shaking hands with each other. In some cases, the handshaking is detected by a capacitive sensor or a magnetic sensor. Each of the cases described above in this paragraph is an example of the method described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described herein.

What is claimed:

1. A method comprising:
(a) causing audio content to be audibly presented to a first user;
(b) detecting a set of one or more gestures, which set includes a first gesture that comprises a second user's head being oriented toward the first user;
(c) performing a calculation to determine whether a first privacy setting and a second privacy setting permit the audio content to be shared with the second user, the first and second privacy settings having been selected by the first and second users, respectively; and
(d) if the calculation determines that the first and second privacy settings permit the first audio content to be shared with the second user,
    (i) wirelessly transmitting a radio signal that encodes the audio content,
    (ii) causing a receiver worn by the second user to tune to the radio signal, and
    (iii) causing the audio content to be audibly presented to the second user during a time period in which the first gesture occurs.

2. The method of claim 1, wherein the first gesture is detected by:
(a) transmitting, with an omnidirectional transmitter worn by the first user, an infrared signal; and
(b) receiving, with a directional receiver worn by the second user, the infrared signal.

3. The method of claim 1, wherein the first gesture is detected by:
(a) transmitting, with a directional transmitter worn by the second user, an infrared signal; and
(b) receiving, with an omnidirectional receiver worn by the first user, the infrared signal.

4. The method of claim 1, wherein the first gesture is detected by:
(a) capturing, with one or more cameras, a set of images of a scene, which scene includes the first and second users; and
(b) performing a computer vision algorithm to detect the first gesture, based on the set of images.

5. The method of claim 1, wherein the first gesture is detected by:
(a) emitting, from a first infrared transmitter, a first pattern of infrared light that periodically sweeps across a scene, which scene includes the first and second users;
(b) emitting, from a second infrared transmitter, a second pattern of infrared light that periodically sweeps across the scene;
(c) detecting a first time at which the first pattern of infrared light is incident on infrared sensors that are worn on the first user's head;
(d) detecting a second time at which the second pattern of infrared light is incident on infrared sensors that are worn on the first user's head;
(e) detecting a third time at which the first pattern of infrared light is incident on infrared sensors that are worn on the second user's head;
(f) detecting a fourth time at which the second pattern of infrared light is incident on infrared sensors that are worn on the second user's head; and
(g) calculating position and orientation of the second user's head relative to the first user's head, based on the first, second, third and fourth times.

6. The method of claim 1, wherein:
(a) the radio signal that encodes the audio content is transmitted at a first frequency; and
(b) the method further includes
    (i) transmitting, by an infrared transmitter worn by the first user, a second signal that encodes the first frequency, and
    (ii) receiving, by an infrared receiver worn by the second user, the second signal.

7. The method of claim 1, wherein:
(a) the radio signal that encodes the audio content is transmitted at a first frequency; and
(b) the method further includes
    (i) transmitting a second signal that encodes the first frequency, and
    (ii) receiving, by a receiver worn by the second user, the second signal.

8. The method of claim 1, wherein the wireless transmitting of the radio signal that encodes the audio content is performed by a transmitter worn by the first user.

9. The method of claim 1, wherein the wireless transmitting of the radio signal that encodes the audio content is performed by a transmitter that is more than one meter away from each of the first and second users.

10. The method of claim 1, wherein the method includes mixing, by a mixer worn by the second user, audio signals.

11. The method of claim 1, wherein:
(a) the method includes mixing, by a mixer, audio signals; and
(b) the mixer is more than one meter away from each of the first and second users.

12. The method of claim 1, wherein the detecting includes detecting, at a time after the first gesture starts, one or more of the following gestures by the first user: smile, nodding head up and down, or thumbs up.

13. The method of claim 1, wherein the detecting includes detecting, at a time after the first gesture starts, one or more of the following gestures by the second user: smile, nodding head up and down, or thumbs up.

14. The method of claim 1, wherein the detecting includes detecting, at a time after the first gesture starts, one or more of the following gestures: (a) the first and second users shaking hands, or (b) the first and second users high-frying each other.

15. The method of claim 1, wherein:
(a) the set of one or more gestures includes multiple gestures by the first or second users; and
(b) the multiple gestures are detected by analyzing images captured by one or more cameras.

16. The method of claim 1, wherein the detecting includes capturing an image of the first user while (i) the first user is smiling and (ii) the first and second users are facing each other.

17. The method of claim 1, wherein the detecting includes capturing images of the first and second users while the first user nods the first user's head and simultaneously the first and second users are facing each other.

18. The method of claim 1, wherein the detecting includes:
(a) detecting, by one or more accelerometers, gyroscopes or magnetometers that are worn by the first user, nodding of the first user's head; and
(b) simultaneously detecting that the first and second users are facing each other.

19. The method of claim 1, wherein the detecting includes detecting the first and second users shaking hands with each other.

20. The method of claim 19, wherein the handshaking is detected by a capacitive sensor or a magnetic sensor.

\* \* \* \* \*